United States Patent
Morris et al.

(10) Patent No.: US 9,122,989 B1
(45) Date of Patent: Sep. 1, 2015

(54) ANALYZING WEBSITE CONTENT OR ATTRIBUTES AND PREDICTING POPULARITY

(71) Applicant: InsideSales.com, Provo, UT (US)

(72) Inventors: Richard Morris, Sandy, UT (US); Xinchuan Zeng, Orem, UT (US); David Elkington, Springville, UT (US); Kenneth Krogue, Alpine, UT (US)

(73) Assignee: InsideSales.com, Provo, UT (US)

( * ) Notice: Subject to any disclaimer, the term of this patent is extended or adjusted under 35 U.S.C. 154(b) by 286 days.

(21) Appl. No.: 13/840,424

(22) Filed: Mar. 15, 2013

Related U.S. Application Data

(60) Provisional application No. 61/757,696, filed on Jan. 28, 2013.

(51) Int. Cl.
*G06N 5/00* (2006.01)
*G06F 7/00* (2006.01)
*G06N 5/02* (2006.01)

(52) U.S. Cl.
CPC .......................................... *G06N 5/02* (2013.01)

(58) Field of Classification Search
CPC ....................................................... G06N 5/02
See application file for complete search history.

(56) References Cited

U.S. PATENT DOCUMENTS

| | | | |
|---|---|---|---|
| 7,548,915 B2 * | 6/2009 | Ramer et al. | 705/14.54 |
| 8,893,012 B1 * | 11/2014 | Zhang et al. | 715/738 |
| 2006/0004704 A1 * | 1/2006 | Gross | 707/2 |
| 2006/0184481 A1 | 8/2006 | Zhang et al. | |
| 2007/0136753 A1 * | 6/2007 | Bovenschulte et al. | 725/46 |
| 2009/0271368 A1 * | 10/2009 | Channell | 707/3 |
| 2009/0319518 A1 | 12/2009 | Koudas et al. | |
| 2010/0161613 A1 | 6/2010 | Rao | |
| 2010/0257117 A1 | 10/2010 | Shvadron et al. | |
| 2011/0022602 A1 | 1/2011 | Luo et al. | |
| 2011/0302124 A1 | 12/2011 | Cai et al. | |
| 2011/0320715 A1 | 12/2011 | Ickman et al. | |

* cited by examiner

*Primary Examiner* — Alan Chen
(74) *Attorney, Agent, or Firm* — Hickman Palermo Becker Bingham LLP

(57) ABSTRACT

A method to analyze and determine which source content and user interactions are most popular is provided. The method generates scores for items, e.g., articles, topics, authors, or influencers, on a particular source based on data gathered from both the particular source and social media sources. The scores are used to rank items of the same type, and determine which items are the most popular. The method may also take demographic information as input. Using the demographic information, the system may determine the popularity of a particular item in a particular demographic. The method may also predict which demographic an item may be the most popular in. Furthermore, the method may give a recommendation on which author should write on a particular topic, which topic is most likely to be the most popular for a particular demographic, and which influencers should promote the article.

28 Claims, 4 Drawing Sheets

ANALYZING WEBSITE CONTENT OR ATTRIBUTES AND PREDICTING POPULARITY

CROSS-REFERENCE TO RELATED APPLICATIONS; BENEFIT CLAIM

This application claims the benefit of provisional application 61/757,696 filed Jan. 28, 2013, the entire contents of which are hereby incorporated by reference for all purposes as if fully set forth herein.

FIELD OF THE INVENTION

The present invention relates to web content analysis and, more specifically, to analyzing website content and predicting popularity.

BACKGROUND

In many online environments, authors write and publish articles about topics of interest, and community members read, comment on, rate and/or share the articles with others. A community member that influences other community members is referred to herein as an "influencer." In a social network, for example, an influencer may be a user that is connected to many other users and who regularly shares or comments on articles written by others.

Successfully determining which articles, topics, authors and influencers are currently important or popular to a target demographic is extremely important in informing business decisions. For example, marketing to a particular demographic ("targeted marketing") is more effective if the topics that are most popular to the particular demographic are known. Matching popular authors with popular topics can help create popular articles. Furthermore, selecting influencers that are popular in the target demographic to help disseminate an article may increase the popularity of the article. Currently, tools like website analytics and social media websites alone do not provide sufficient insight to determine or predict which articles, topics, authors, or influencers are popular for a particular demographic.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation in the figures of the accompanying drawings and in which like reference numerals refer to similar elements and in which.

DETAILED DESCRIPTION

Figure 1:
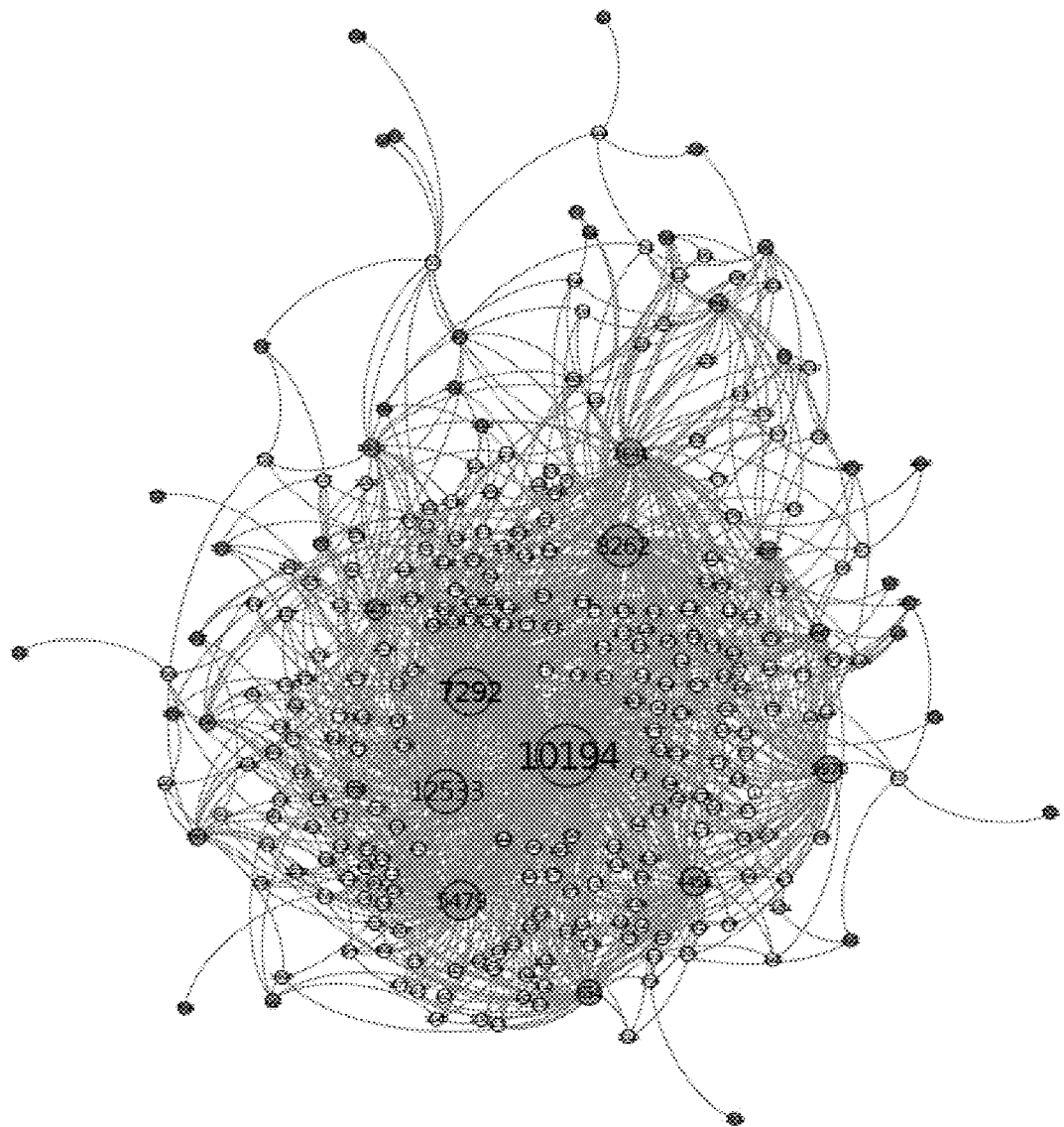
FIG. 1 is an example community of authors and their friends according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for generating "composite scores" for articles, topics, authors, and influencers. For convenience of expression, an "item" is an article, topic, author, or influencer. Unlike other popularity metrics, the composite score described herein are based on data gathered from both the particular source, e.g., website, to which an item belongs and social media websites that are separate and distinct from that particular source. The composite score of each item may be used to rank items of the same type, and determine which items are the most popular. In some embodiments, the composite scores are also used to predict whether articles, topics, authors, or influences are increasing or decreasing in popularity.

Techniques are also provided for using the composite scores to determine the popularity of a particular item in a particular demographic. Knowing the demographic-specific popularity of an item may be useful to push the most interesting content to each user. For example, a user that belongs to a particular demographic may receive suggested readings based on the demographic-specific score of a set of articles in the particular demographic.

Techniques are also provided for predicting which demographic an item may be the most popular in. In addition, techniques are provided for predicting which topics and authors will be popular in the future and which will become less popular.

Furthermore, techniques are provided for giving a recommendation regarding which author should write on a particular topic, which topic is most likely to be the most popular for a particular demographic, and which influencers should promote the article. For example, a marketing manager may wish to have an article written about a particular product, the company could use the techniques described herein to determine which author should write the article. Matching good authors with hot topics may help create popular articles. Likewise, if an influential user shares an article then it is more likely to be consumed and shared by others. Identifying key influencers within a demographic may also help articles gain popularity.

Topic Extraction

To determine which topics are popular based on user interaction with articles, it is necessary to determine which topics are covered in each article. However, the relationship between a topic and an article need not be all or nothing. For example, an article may be primarily about one topic, but tangentially about three other topics. Thus, according to one embodiment, a determination is made about how strongly articles are associated to each of a plurality of topics.

For example, according to one embodiment, topics are extracted from articles using topic modeling. Topic extraction may be performed according to any topic modeling algorithm, such as Probabilistic Latent Semantic Indexing, Latent Dirichlet Allocation, or Pachinko Allocation. Topic extraction may be automated, require human interaction, or some hybrid of the two. Consistency may be improved with some amount of human control or supervision.

After one or more topics are extracted from an article, the article may be represented as a distribution of topics, denoting the proportion of the article each topic represents. For example, $\text{TopicModel}_{i,j}$ may be a value from zero to one, inclusively, and represent how much of article$_i$ consists of topic$_j$.

Accordingly, when a topic is extracted from an article, the topic may be represented as a probability distribution and the scores based on the topic may be adjusted based on the probability distribution. Alternatively, when a topic is extracted from an article, the topic may be a binary decision, e.g., a topic is or is not included in an article.

Social Networking Analysis

As mentioned above, an influencer is any community member that has an influence on other community members. Influencers may include, but are in no way limited to, bloggers, facebookers, tweeters, commenters, etc. Social media interactions may include, but are in no way limited to, posts, shares, likes, tweets, retweets, comments, etc.

A graph, $G_1$, may be created for article, based on the influencers and interactions, such that:

$$G_i = (\text{Influencers}(\text{article}_i), \text{Interactions}(\text{article}_i)),$$

where the vertices are the Influencers(article$_i$) and the edges are the Interactions(article$_i$).

Using these graphs, community mining algorithms are used in order to define tight-knit groups of related influencers. These communities can be visualized and interesting vertices can be picked by hand. Objective metrics may also be used to determine which vertices are the most interesting. For example, the top ten vertices ordered by the number of edges connected to the vertices, respectively.

FIG. 1 is an example community of authors and their friends according to an embodiment. In FIG. 1, the authors and their friends are vertices, and the edges denote the friendships between users. Anomalous users can be identified from this graph based on an unusual number of friends or those who are friends with an unusual number of other authors in the community. For example, nodes 10194, 12533, and 8262 have an abnormal number of friends that are authors and may be considered more influential in that community.

Composite Scores

As mentioned above, a composite score is based, at least in part, on two sub-scores: a source score and a social media score. The source score generally represents how much direct interaction an item has received relative to other items, from the same source, during the same time period. In many situations, that "source" will be a website. In those situations, the direct interactions with an item from a particular website are compared to the direct interactions with other items, of the same type, at the same website. Hence, the score that compares one item associated with a source with other items associated with that same source is referred to herein as a "source score."

However, in other situations, the source may be an entity other than a website. For example, the item may be an article from a particular feed. In that case, the source score is based on a comparison between direct interactions with the article and direct interactions with other articles from the same feed. Alternatively, the item may be multimedia, such as video or audio, on a multimedia service. In that case, the source score is based on a comparison between direct interactions with the multimedia and direct interactions with other multimedia from the same video service. The techniques described herein are not limited to any particular type of source. Thus, the term "source score" does not necessarily imply that the source used in computing the score is a website.

In contrast to the source score, the social media score indicates how much indirect attention the item has received in one or more social networks relative to other items of the same type in the same one or more social networks.

An item's composite score may be a linear combination of the item's source score and social media score. The linear combination can be adjusted to reflect which factor (website popularity or social media popularity) is more important to the purpose for which the composite score is being generated. The source score may be calculated from data related to, or retrieved from, the original website that the item is from or associated with. For example, the source score for an article posted on Forbes.com is based on the data retrieved or regarding Forbes.com. The social media score may be calculated by retrieving and analyzing data from social media websites. For example, a social media score for an article posted on Forbes.com may be based, at least in part, on tweets that reference the article, or user profiles of people that referenced the article on Twitter.

In some situations, the composite score may be composed of sub-scores that are interdependent. Accordingly, some scores may be relaxed to improve accuracy. For example, an item's composite score may depend on another item's composite score, and visa-versa. The accuracy of each interdependent item's composite score may be more accurate as the two composite scores for both items are iteratively relaxed.

In one embodiment, the composite score for the item may be a product of a scalar, alpha, and the item's source score, plus the product of one minus alpha and the item's social media score, where alpha is between zero and one, inclusively. The following equation may be used by such an embodiment:

$$\text{composite\_score} = \alpha(\text{website\_score}) + (1-\alpha)(\text{social\_media\_score}).$$

This is merely one of any number of source scores and social media scores that may be used as factors in the calculation of composite scores. How source scores and social media scores are combined to generate composite scores may vary from implementation to implementation, and the techniques described herein are not limited to any particular method of combining scores. Both source scores and social media scores, which are factors in the composite scores, are described in greater detail hereafter.

Thresholds

The thresholds used to calculate various scores discussed below may be chosen based, at least in part, on a mean, variance, standard deviation, median, or other statistics derived from the data collected for items of the same type. For example, assume that the average article on a particular website had 5000 total views, and that one standard deviation was 500. Based on this information, the total-views score for an article on that website may be generated by dividing the total views of the article by 6000 (i.e. the mean plus two standard deviations). Alternatively, the threshold is some number chosen by an administrator. Another alternative involves using the average number of views of the items in the top ten percent of articles on the website.

Since the threshold may not be the absolute highest number possible, the result of dividing total number of views by the threshold may exceed one. Accordingly, the results may be capped at one, such that the total-view score range may be a value from zero to one, inclusively, regardless of the threshold.

Exemplary Factors of a Source Score

The source score for an item may be calculated from data related to, or retrieved from, the original website that the item is from or associated with. Furthermore, many factors may be used to compute the source score. For example, the source score may be computed from a total-views score, a views-per-hour score, a total-share score, a shares-per-hour score, a total-comment score, a sentiment score, a rating score, the domain popularity score, the score of other related items from or related to the website, or many other factors.

The source score may be a linear combination of the factors. For example, the factors may each be computed on a range from zero to one. Weights, which sum to one, may be multiplied against the factors, respectively, to generate a source score from zero to one, inclusively. The weight may be used to emphasize or diminish the influence of a particular factor.

Total-Views Score

The total-views score may provide insight into the overall popularity of the item compared to the other items on the website. According to one embodiment, a total-view score may be computed by summing the total number of views the item has received, divided by some threshold value:

$$\text{total\_views\_score}(\text{item}_i) = \frac{\text{total\_views}(\text{item}_i)}{\text{total\_views\_threshold}}.$$

The total number of views may be the number of times the website on which the item resides provides the item (or derivative thereof) to users. For example, the total number of views for an article may the number of times the particular article was viewed. The total number of views for a topic may be based, at least in part, on the total number of times each article with the particular topic was viewed. The total number of views for an author may be based, at least in part, on the total number of views each of the author's articles received, or the number of times the author's profiled was viewed. The total number of views for an influencer may be the number of times the influencer's posted link was clicked.

Views-Per-Hour Score

The views-per-hour score may provide insight into how popular an item currently is compared to the other items or the momentum of the item. The views-per-hour score may be computed by summing the total number of views the item has received within the last sixty minutes, or within a particular hour, and dividing by some threshold value:

$$\text{views\_per\_hour\_score}(\text{item}_i) = \frac{\text{views\_within\_hour}(\text{item}_i)}{\text{views\_per\_hour\_threshold}}.$$

Total-Share Score

The total-share score may provide insight into the overall "virality" of an item, how viral an item is, compared to the other items on the website. A total-share score may be computed by summing the total number shares divided by a threshold value:

$$\text{total\_share\_score}(\text{item}_i) = \frac{\text{total\_shares}(\text{item}_i)}{\text{total\_shares\_threshold}}.$$

A "share" may be any reference to, mention of, or interaction with, the item. For example, the total number of shares for an article may be the number of times the article was linked to or mentioned on other websites. The total number of shares for a topic may be based, at least in part, on the total number of shares each article with subject matter related to the topic received. The total number of shares for an author may be based, at least in part, on the total number of shares each of the author's articles received, or the number of times a link to the author's profile was shared. The total number of shares for an influencer may be the number of times the influencer's posted link was "re-shared" or "re-tweeted."

Commonly the source URL of a user visiting a site is included in an HTTP request. Therefore a website may track where a user came from before viewing the item. For example, if a user clicks on a link that refers the user to an item on a website, while browsing Twitter.com, the website can record that the user came from Twitter.com and thus deduce the item was shared on Twitter.com. Thus, to estimate the number of shares, a search of the website's logs may be all that is required. If, however, the source URL is the same for two or more views, then the two or more views may count as only one share.

Shares-Per-Hour Score

The shares-per-hour score may provide insight into the current virality of the item or the virality momentum, the current rate the item is being shared compared to the other items on the website. The shares-per-hour score may be computed by summing the total number of shares the item has received within the last sixty minutes, or within a particular hour, and dividing by a threshold:

$$\text{shares\_per\_hours\_score}(\text{item}_i) = \frac{\text{shares\_within\_hour}(\text{item}_i)}{\text{shares\_per\_hour\_threshold}}.$$

Total-Comment Score

The total-comment score may provide insight into the overall popularity or significance of the item compared to the other items on the website. A user that leaves a comment takes much more time than a user that simply views an item and moves on. Thus, the number of comments an item has may be an indicator of the item's popularity. A total-comment score may be computed by summing the total number of comments the item has received, divided by some threshold value.

$$\text{total\_comment\_score}(\text{item}_i) = \frac{\text{total\_comments}(\text{item}_i)}{\text{total\_comments\_threshold}}$$

The "total number of comments" may be the number of times an item or derivative was commented on. For example, the total comments for an article may be the number of times the particular article was commented on. The total number of comments for a topic may be based, at least in part, on the total number of comments for each article with a particular topic received. The total number of comments for an author may be based, at least in part, on the total number of comments each of the author's articles received, or the number of comments on the author's profile. The total number of comments for an influencer may be the number of times the influencer's posted link was responded to or commented on.

Sentiment Score

The sentiment score may be calculated based on the text in comments, articles, profiles, or social media interactions. The sentiment may be determined using any number of methods, such as, latent semantic analysis or support vector machines. The sentiment may be a determination as to what degree the topic discussed was positive or negative. For example, a zero may mean that the text discussing a particular topic was negative, and one may indicate that the text was positive. Sentiment analysis may also be used to determine other classifications, e.g., anger or excitement.

Rating Score

The rating score may be calculated based on a binary or scaled rating system, e.g., a thumbs up or thumbs down system, or a 5-star system. Similar to the scores discussed above, the rating score may be normalized between zero and one, inclusively.

Domain Popularity Score

The domain popularity score may provide insight into how influential or popular the domain is on which the item is posted. For example, an article posted on Forbes.com may be given a higher domain popularity score than an article with the same number of shares on a person's blog because Forbes.com has a better reputation or is more popular. Thus all items on a particular website may have the same domain popularity score. The domain popularity score may be based on the PageRank, Alexa.com rank, or some other ranking data, index, or service. Alternatively, a page popularity score may be used such that items on the same page, rather than the same domain, have the same domain popularity score. Another alternative is that the domain popularity score is device-specific. That is, for each type of device, the same domain may have different domain popularity scores. For example, Facebook.com may have higher domain popularity generally, but Twitter.com may have a higher domain popularity for mobile phone devices.

Examples of Calculating Source Scores

In addition to the methods described above, the following exemplary embodiments may also be used to calculate the source score for articles, topics, authors, and influencers.

Each of the factors used to calculate each item's source score may be weighted based on the perceived importance of each element. In an embodiment, the weights for all the factors sum to one, such that the sum of the product of the weights, $w_i$, and the factors, $f_i$, respectively, has a range from zero to one, inclusively. Thus, $$\sum_i w_i = 1, \text{ and } 0 \leq \sum_i w_i f_i \leq 1.$$

Articles

The source score for an article may be based on the following elements: 1) the number of times the article was viewed, divided by a total views threshold; 2) the number of shares per hour, divided by a shares per hour threshold; 3) the number of views per hour, divided by a views per hour threshold; 4) the number of shares in the last hour, divided by a shares per hour threshold; 5) the number of comments, divided by a total comments threshold; 6) a rating score, divided by the maximum rating score possible; 7) the comment sentiment for the p comments on the article; 8) the average topic composite score for each of the n topics in the article; 9) the average composite score for each of the m authors for the article. An equation for calculating the source score for an article, $article_i$, in such an embodiment may be, for example:

$$\text{website\_score}(article_i) = w_0 \cdot \text{total\_views\_score}(article_i) +$$
$$w_1 \cdot \text{total\_shares\_score}(article_i) + w_2 \cdot \text{views\_per\_hour\_score}(article_i) +$$
$$w_3 \cdot \text{shares\_per\_hour\_score}(article_i) +$$
$$w_4 \cdot \text{total\_comments\_score}(article_i) + w_5 \cdot \text{rating\_score}(article_i) +$$
$$w_7 \cdot \frac{1}{p} \sum_j^p \text{sentiment\_score}(comment_j(article_i)) +$$
$$w_8 \cdot \frac{1}{n} \sum_{j=1}^m \text{composite\_score}(author_j).$$

Topics

The source score for a topic may be based on the following elements: 1) the average views per article for each of the n articles that includes the topic, divided by an average views per article threshold; 2) the average article composite score for each of the n articles that include the topic; 3) the average author composite score for each of the m authors that write an article that includes the topic. An equation for calculating the source score for a topic, $topic_i$, in such an embodiment may be, for example:

$$\text{website\_score}(topic_i) =$$
$$w_1 \cdot \frac{1}{n \cdot \text{average\_view\_threshold}} \sum_{j=1}^n \text{number\_views}(article_j) +$$
$$w_2 \cdot \frac{1}{n} \sum_{j=1}^n \text{composite\_score}(article_j) +$$
$$w_3 \cdot \frac{1}{m} \sum_{j=1}^m \text{composite\_score}(author_j).$$

Authors

The source score for an author may be based on the following elements: 1) the number of the author's subscribers, divided by a subscriber threshold; 2) the average views per article for each of the n articles the author has written, divided by an average view per article threshold; 3) the average number of comments for each of the n articles the author has written, divided by an average author comment threshold; 4) the average article composite score for each of the n articles the author has written; 5) the average topic composite score for each of the m topics the author has written about. An equation for calculating the source score for an author, author, in such an embodiment may be, for example:

$$\text{website\_score}(\text{author}_i) = w_1 \cdot \frac{\text{number\_of\_subscribers}(\text{author}_i)}{\text{number\_of\_subscribers\_threshold}} +$$
$$w_2 \cdot \frac{1}{n \cdot \text{average\_view\_threshold}} \sum_{j=1}^{n} \text{number\_view}(\text{article}_j) +$$
$$w_3 \cdot \frac{1}{n \cdot \text{average\_comments\_threshold}} \sum_{j=1}^{n} \text{number\_comments}(\text{article}_j) +$$
$$w_4 \cdot \frac{1}{n} \sum_{j=1}^{n} \text{composite\_score}(\text{article}_j) +$$
$$w_5 \cdot \frac{1}{m} \sum_{j=1}^{m} \text{composite\_score}(\text{topic}_j).$$

Influencers

The source score for an influencer may be based on the following elements: 1) the average author composite score for each of the n authors the influencer discussed; 2) the average composite score for each of the m articles the influencer discussed; 3) the average composite score for each of the p topics the influencer discussed; 4) the average comment sentiment for each of the q comments the influencer posted. An equation for calculating the source score for an influencer, Influencer, in such an embodiment may be, for example:

$$\text{website\_score}(\text{Influencer}_i) = w_1 \cdot \frac{1}{m} \sum_{j=1}^{m} \text{composite\_score}(\text{author}_j) +$$
$$w_2 \cdot \frac{1}{n} \sum_{j=1}^{n} \text{composite\_score}(\text{article}_j) +$$
$$w_3 \cdot \frac{1}{p} \sum_{j=1}^{p} \text{composite\_score}(\text{topic}_j) + w_4 \cdot \frac{1}{q} \sum_{j=1}^{q} \text{sentiment}(\text{comments}_j).$$

Exemplary Factors of a Social Media Score

The social media score for an item may be calculated from data related to, or retrieved from, websites other than the site with which the item is associated. For example, assume that an author publishes an article on Forbes.com. Under these circumstances, a post on Twitter.com discussing the author or the article may be used to calculate a social media score of the author. Many factors may be used to compute the social media score of an item. For example, the social media score may be computed from a reputation score, a total-share score, a total-reshare score, or many other factors.

The social media score may be a linear combination of the factors. For example, all of the factors may be computed on the range from zero to one. Weights, which sum to one, may be multiplied against the factors, respectively, to generate a social media score from zero to one, inclusively. The weight may be used to emphasize or diminish the influence of a particular factor.

Reputation Score

The reputation score may provide insight into how many followers a particular item may have. A "follower" may be any friend, reader, subscriber, purchaser, or anyone actively engaged with the item. For example, a reputation score for an author may be based on the number of followers, friends, or subscribers an author has.

The reputation score may also be based on the social networking analysis discussed above, and based on a particular community. For example, if a particularly significant influencer in a particular community is tweeting about an article, the article may have a higher reputation score.

Calculating the reputation score may also depend on the specific social media used, and its ability to prevent gaming. For example, if a social network allows a user to create a massive number of accounts which all follow one user, in order to make the one user appear more significant, then the reputation score may be lower.

The reputation score may also be normalized between zero and one, inclusively, compared to other items of a similar type. Reputation scores above one may be capped at one.

Total-Share Score

The total-share score is similar to the total-share score discussed above in the source score section. However, the total-share score for the social media score is different from the total-share score for the source score because the data used to compute the total-share score for the social media score may be gathered from social media websites rather than from the website that the item is on. The total-share score may also be based on the social networking analysis discussed above, and based on a particular community. A total-share score for the social media score may be computed by summing the total number of shares divided by a threshold value:

$$\text{total\_sms\_share\_score}(\text{item}_i) = \frac{\text{total\_sms\_shares}(\text{item}_i)}{\text{total\_sms\_shares\_threshold}}.$$

Total-Reshare Score

The total-reshare score is similar to the total-share score previously discussed, however, the total-reshare score reflects the number of times that users are sharing something that has already been shared. For example, a "retweet" on Twitter.com or a "reblog" on Tumblr.com may both be reshares. The total-share score may also be based on the social networking analysis discussed above, and based on a particular community. A total-reshare score for the social media score may be computed by summing the total number of reshares divided by a threshold value:

$$\text{total\_sms\_reshare\_score}(\text{item}_i) = \frac{\text{total\_sms\_reshares}(\text{item}_i)}{\text{total\_sms\_reshares\_threshold}}.$$

Examples Calculating Social Media Scores

In addition to the methods described above, the following exemplary embodiments may also be used to calculate the social media score for articles, topics, authors, and influencers.

Each of the factors used to calculate each item's social media score may be weighted based on the perceived importance of each element. In an embodiment, the weights for all the factors sum to one, such that the sum of the product of the weights, $w_i$, and the factors, $f_i$, respectively, has a range from zero to one, inclusively. Thus, $$\sum_i w_i = 1, \text{ and } 0 \le \sum_i w_i f_i \le 1.$$

Articles

The social media score for an article may be based on the following elements: 1) the average influencer composite score for each of the n influencers that made a post regarding the article; 2) the average number of followers for each of the n influencers that made a post regarding the article, divided by an average number of followers per influencer threshold; 3) the number of shares, divided by a number of shares threshold; 4) the number of reshares, divided by a number of reshares threshold. An equation for calculating the social media score for an article in such an embodiment may be, for example:

$$social\_media\_score(article_i) = w_1 \cdot \frac{1}{n} \sum_{j=1}^{n} composite\_score(Influencer_j) +$$

$$w_2 \cdot \frac{1}{n \cdot average\_follower\_threshold} \sum_{j=1}^{n} number\_followers(Influencer_j) +$$

$$w_3 \cdot total\_sms\_share\_score(article_i) +$$

$$w_4 \cdot total\_sms\_reshare\_score(article_i).$$

Topics

The social media score for a topic may be based on the following elements: 1) the average influencer composite score for each of the n influencers that posts regarding the topic; 2) the average number of followers for each of the n influencers that posts regarding the topic, divided by an average number of followers per influencer threshold; 3) the average number of shares for each of the m articles that discusses the topic, divided by a share total threshold; 4) the average number of reshares for each of the m articles that discusses the topic, divided by a reshare threshold. An equation for calculating the social media score for a topic, $topic_i$, in such an embodiment may be, for example:

$$social\_media\_score(topic_i) = w_1 \cdot \frac{1}{n} \sum_{j=1}^{n} composite\_score(Influencer_j) +$$

$$w_2 \cdot \frac{1}{n \cdot average\_follower\_threshold} \sum_{j=1}^{n} number\_followers(Influencer_j) +$$

$$w_3 \cdot \frac{1}{m \cdot average\_share\_threshold} \sum_{j=1}^{m} number\_shares(article_j) +$$

$$w_4 \cdot \frac{1}{m \cdot average\_reshare\_threshold} \sum_{j=1}^{m} number\_reshares(article_j).$$

Authors

The social media score for an author may be based on the following elements: 1) the average influencer composite score for each of the n influencers that discusses the author; 2) the average number of shares for each of the m articles that the author writes, divided by an average number of shares per article threshold; 3) the average number of reshares per article that the author has written, divided by an average reshare per article threshold; 4) the average number of followers for each of the n influencers that discusses the author, divided by an average number of followers per influencer threshold. An equation for calculating the source score for an author, author, in such an embodiment may be, for example:

$$social\_media\_score(author_i) = w_1 \cdot \frac{1}{n} \sum_{j=1}^{n} composite\_score(Influencer_j) +$$

$$w_2 \cdot \frac{1}{m \cdot average\_share\_threshold} \sum_{j=1}^{m} number\_shares(article_j) +$$

$$w_3 \cdot \frac{1}{m \cdot average\_reshare\_threshold} \sum_{j=1}^{m} number\_reshares(article_j) +$$

$$w_4 \cdot \frac{1}{n \cdot average\_followers\_threshold} \sum_{j=1}^{n} number\_followers(Influencer_j).$$

Influencers

The social media score for an influencer may be based on the following elements: 1) the number of shares the influencer makes, divided by a number of shares threshold; 2) the number of comments the influencer makes, divided by a number of comments threshold; 3) the number of neighbors a influencer has in a graph built as previously discussed, divided by a number of neighbors threshold; 4) the number of followers or friends the influencer has, divided by a number of followers or friends threshold. An equation for calculating the source score for an influencer, Influencer, in such an embodiment may be, for example:

$$website\_score(Influencer_i) =$$

$$w_1 \cdot \frac{number\_shares(Influencer_i)}{shares\_threshold} + w_2 \cdot \frac{number\_comments(Influencer_i)}{comments\_threshold}$$

-continued $$w_3 \cdot \frac{\text{number\_neighbors(Influencer}_i)}{\text{neighbors\_threshold}} +$$

$$w_4 \cdot \frac{\text{number\_followers(Influencer}_i)}{\text{followers\_threshold}}.$$

Handling Interdependent Scores

In some cases, the score for one item may be interdependent with the score of another item, such that a change in one item's composite score will cause another item's composite score to change, and visa-versa. For example, an author's composite score may be dependent on the composite score of an article that the author wrote. Likewise, the article's composite score may be dependent on the composite score of the author that wrote the article. Thus, when the composite score of the article changes then the composite score of the author may change. Inversely, when the composite score of the author changes the composite score of the article may change. Furthermore, the sub-scores for two or more items may also be interdependent. Some scores must be given some default value so that the system has somewhere to start the relaxation process.

The process of establishing scores for interdependent values is referred to herein as relaxation. In general, relaxation involves iteratively computing two or more interdependent values, such that each value takes the other recently computed value as input. For example, for a first score and a second score which are interdependent, a default value may be assigned to the first score. The second score can then be computed taking the default first score as input. After the second score is computed the first score may be computed using the second score as input. Since the second score took the default first score, rather than the "true" value that the default first score approximates, the second score may be recalculated using the newly calculated first score. Likewise, the first score may be recalculated using the newly calculated second score. This process is relaxation and may continue indefinitely until certain criteria are met.

The iteration difference may be the difference, or the absolute value of the difference, between a value and the value after an iteration. For example, if a first score is estimated to be 0.5, and on the next iteration the first score is updated to 0.7, then the iteration difference is 0.2. On the next iteration, if the first score is estimated to be 0.75, then the iteration difference is 0.05.

A relaxation rate may be used to control the relaxation process, specifically, on the nth iteration a score $S_n$ may be given as:

$$S_n = S_{n-1} + R \cdot \text{IterationDifference},$$

where $S_{n-1}$ is the previous estimated score and R is the relaxation rate. For example, if a first score is estimated to be 0.5 and on the next iteration the estimated score is 0.7, with a relaxation rate of 0.5, then the iteration difference is 0.2 and first score will be assigned 0.6, which is the previous estimated score, plus the product of the relaxation rate and the iteration difference. All scores may have the same relaxation rate. Alternatively, each score may use a different relaxation rate. Further still, a relaxation may be variable over time.

As a score is iteratively relaxed, the score may converge or reach equilibrium, thus the iteration difference may decrease over time. For example, a score may be relaxed until the iteration difference is equal to zero. However, in some cases it may be computationally prohibitive to iterate until the iteration difference for all the scores reaches zero. Accordingly, a score may be approximated by relaxing the score until the iteration difference reaches a particular threshold. The threshold may be based, at least in part, on the score's iteration difference, the average iteration difference of a group of scores, the relaxation rate, or a constant value. For example, the iteration difference threshold for a score may be based, at least in part, on the score's average iteration difference, the variance of a score's iteration difference, or the gradient of the iteration difference.

Relaxation may also be terminated early based, at least in part, on the number of iterations performed or the time period over which a score has been relaxed. For example, relaxation may be terminated after performing a threshold number of iterations. Relaxation may be terminated after relaxing a score for a certain amount of time.

Exemplary Relaxing Process

Figure 2:
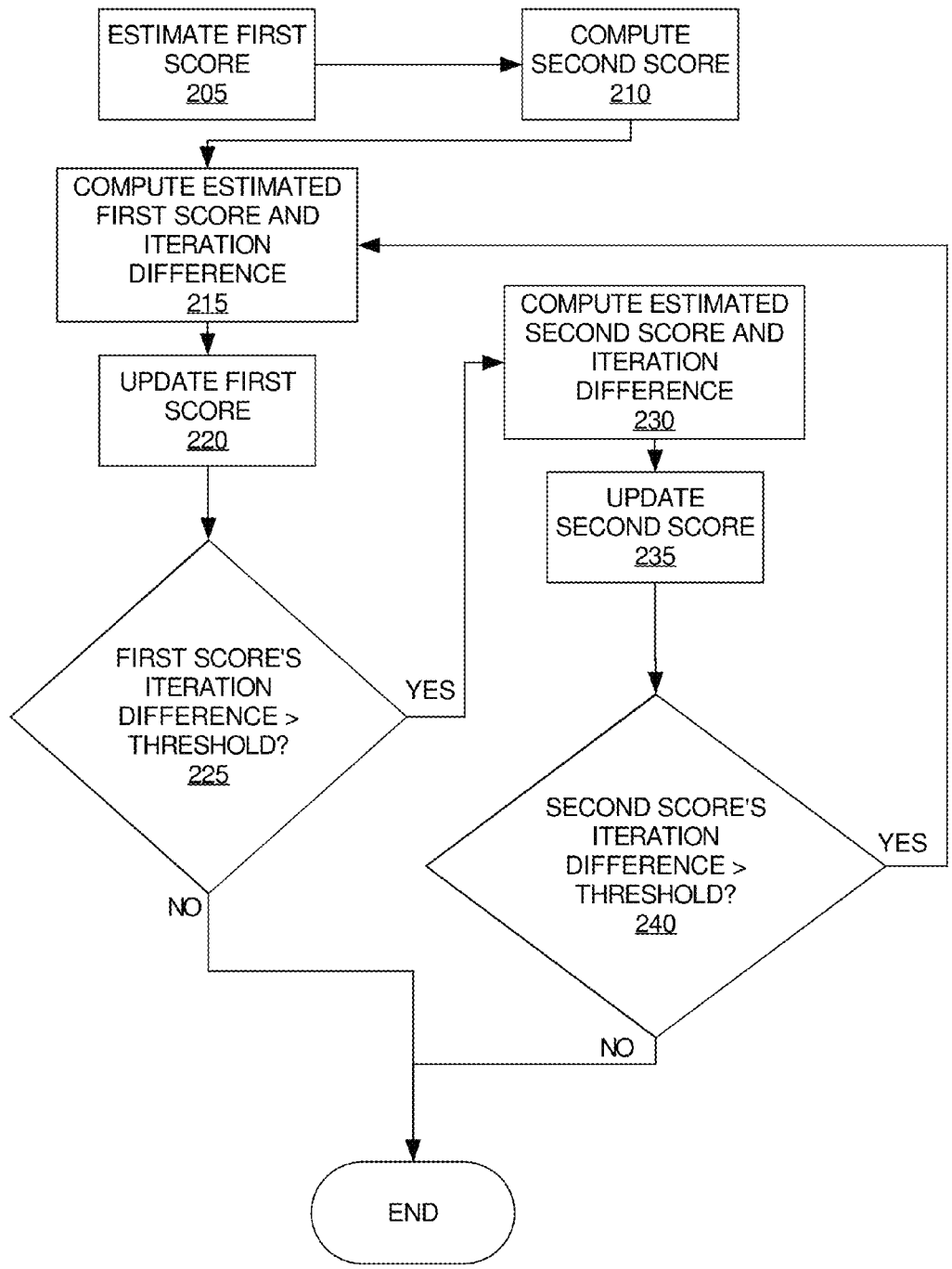
FIG. 2 is a flowchart illustrating a process relaxing two scores, according to an embodiment.

FIG. 2 is a flowchart illustrating a process relaxing two scores, according to an embodiment. While FIG. 2 illustrates exemplary steps according to an embodiment, other embodiments may omit, add to, reorder, and/or modify any of the steps shown.

In step 205, a process estimates a first score, which is interdependent with a second score. For example, the first score may be an article's composite score, and the second score may be an author's composite score, wherein the author is the article's author. Thus, in step 205, the article's composite score may be estimated by leaving out the author's composite score as a factor, or assuming the author's composite score is zero, since the author's composite score has not yet been computed. For the purpose of explanation, it shall be assumed that the article's composite score has an estimated value of 0.5.

In step 210, the process computes the second score, which is interdependent with the first score. In the present example, in step 210, the author's composite score is computed based on the article's composite score (as determined in step 205). For the purpose of explanation, it shall be assumed the author's score is 0.7, using as a parameter the estimated article's composite score, 0.5.

In step 215, the process computes the estimated first score, taking as a parameter the most recently computed value of the second score, and the iteration difference. In the present example, in step 215, the article's composite score is estimated using the author's composite score, 0.7, as a parameter. For purposes of explanation it shall be assumed the article's estimated composite score is computed to be 0.8, and thus the iteration difference is computed to be 0.3.

In step 220, the first score is updated based, at least in part, on the relaxation rate and the iteration difference. In the present example, and for purposes of explanation, it shall be assumed that the relaxation rate is 0.2. Accordingly, the article's composite score is updated to 0.56, which is the previous value, plus the product of the relaxation rate and the iteration difference.

In step 225, the process compares the first score's iteration difference with a threshold. If the first score's iteration difference is greater than the threshold, then the process continues to step 230, otherwise the process terminates. In the present example, and for the purpose of explanation, it shall be assumed the threshold is 0.1. Since the article's composite score's iteration difference is greater than the threshold the process continues to step 230.

In step 230, the process computes the estimated second score, taking as a parameter the most recently computed value of the first score, and the iteration difference. In the present example, in step 230, the author's composite score is computed using the article's composite score, 0.56, as a parameter. For purposes of explanation it shall be assumed the author's estimated composite score is computed to be 0.75, and thus the iteration difference is computed to be 0.05.

In step 235, the second score is updated. In the present example and for purposes of explanation is shall be assumed that the relaxation rate is 0.2. Accordingly, the author's composite score is updated to 0.71, which is the previous value, plus the product of the relaxation rate and the iteration difference.

In step 240, the process compares the second score's iteration difference with the threshold. If the second score's iteration difference is greater than the threshold, then the process continues to step 215, otherwise the process terminates. In the present example, since the author's composite score's iteration difference, 0.05, is not greater than the threshold, 0.1, the process terminates.

Impact Scoring

An impact score measures the impact of a given item on a given demographic. The impact score is based, at least in part, on the attributes of each demographic. A demographic describes a group of users with a common set of one or more attributes. A demographic may be defined as a vector, and the vector elements may represent demographic attributes, e.g. a demographic D may be defined as:

$$D = \{d_0, d_1, \ldots, d_n\},$$

where $d_0, d_1, \ldots, d_n$ are the attributes of the demographic.

As a non-limiting example, demographic, D, may be a demographic with four attributes represented as:

$$D_j = \{Age_w, Gender_x, Location_y, Occupation_z\}.$$

In the example above, $Age_w$, may identify the age range of $D_j$, $Gender_x$, may identify a particular gender ("male," "female," or "don't care") of $D_j$, $Location_y$, may identify the geographic region of $D_j$, and $Occupation_z$, may identify a particular job title or industry of $D_j$. The values that define a demographic may be retrieved from social media websites, such as Facebook.com, Twitter.com, or LinkedIn.com.

The impact score for a demographic may be the product of the attribute scores for each attribute in a demographic. For example, the impact score for $D_j$ may be:

$$\text{impact}(x, D_j) = \prod_{i=0}^{n} \text{attribute\_score}(x, d_i),$$

where x is a particular item. The attribute score is discussed in detail below. As long as the range of each of the attribute scores are between zero and one, inclusively, the range of the impact score will be between zero and one, inclusively.

Information gathered from social media websites or other related items may also be included into the demographic score as discussed above, using social networking analysis. For example, to compute an author's demographic impact, an impact score may be based, at least in part, on the demographics of an author's followers on Twitter.com. As another example, to obtain a more accurate impact score for an article, the impact score may be based, at least in part, on the impact score for the topics included in the article. The attribute scores may also be weighted by the importance of the attribute in the demographic.

The impact score may be calculated with different weights for each item based, at least in part, on the importance of each item. Thus, the impact scores are interdependent with other items. Accordingly an impact score, like the composite score, the source score, and the social media score, may be relaxed.

Attribute Score

An attribute score may be computed by dividing the number of interactions a particular group with a common attribute had with a particular item, x, by the number of interactions everyone had with the same item, x. Thus, the attribute score for $d_i$ is:

$$\text{attribute\_score}(x, d_i) = \frac{Num(x, d_i)}{Num(x)}.$$

For example, the attribute score for $Age_w$, where $Age_w$, is an age range of twenty to thirty years old, for a particular article A, may be:

$$\text{attribute\_score}(A, \text{users\_between\_20\_and\_30}) = \frac{Num(A, \text{users\_between\_20\_and\_30})}{Num(A)}.$$

Here, Num(A,users_between_20_and_30) may be the number of users between 20 and 30 years old that have viewed the article A. Num(A) may be the total number of users that read the article A. The function Num may be used to count many types of actions or interactions including, but in no way limited to, views, shares, sentiment, ratings, or reshares, of an article, topic, author, or influencer. The function Num may be used on any attribute that describes a demographic.

Example Impact Scoring

For the purpose of explanation, assume that an article A had been read 100 times. Further assume that ten, of the 100 times, the users reading the article A were between 20 and 30 years old. Still further, assume that five, of the 100 times, the users were female. The attribute score for the age group between 20 and 30 years old is 0.1. The attribute score for females is 0.05. Accordingly, the impact score for the demographic of women between the ages of 20 and 30 years old is 0.1 times 0.05, which is 0.005.

Targeted Marketing and Prediction

Targeted Marketing is marketing directed at a particular demographic, which may include particular leads. A lead is a particular contact that may be interested in a particular product. Typically some demographical information is known about a lead. For example, the information regarding a lead may include, but is in no way limited to, employer, job description, other products purchased, or memberships to particular websites, stores, or clubs. Furthermore, the information regarding a lead may be supplemented by querying social media websites for the lead.

Given a set of articles and a particular lead or demographic, one or more articles may be chosen that are likely to be particularly popular for the particular lead or demographic. For example an article may be chosen based, at least in part, on the composite score of each article$_i$, in a set of articles, and the impact each article, article$_i$, has on the demographic that the lead belongs to, demographic(lead$_k$), such that:

$$MAX[\{composite\_score(Article_i) \cdot impact(article_i, demographic(lead_k))\}]$$

will return the article$_i$, that is the most likely to be popular to lead$_k$. Alternatively, a ranked list of the top most likely popular articles may be returned.

While the example above used a set of articles, the method above may be extended to other item types, or to a set of demographics rather than just one or more leads. For example, a topic may be chosen based, at least in part, on the composite score of each topic$_i$, in a set of topics, and the impact each topic, topic$_i$, has on the demographic, demographic$_k$, such that:

$$MAX[\{composite\_score(topic_i) \cdot impact(topic_i, demographic_k)\}]$$

will return topic$_i$, which is the most likely to be the most popular to demographic$_k$. Alternatively, a ranked list of the top most likely popular topics for a demographic may be returned.

In another example, an author may be chosen based, at least in part, on the composite score of each author, author$_i$, in a set of authors, and the impact each author$_i$ has on the demographic, demographic$_j$, such that:

$$MAX[\{composite\_score(author_i) \cdot impact(author_i, demographic_k)\}]$$

will return author$_i$, which is the most likely to be the most popular to demographic$_k$. Alternatively, a ranked list of the top most likely popular authors for a demographic may be returned.

In another example, an influencer may be chosen based, at least in part, on the composite score of each influencer, Influencer(article$_i$), in a set of influencers, and the impact each Influencer(article$_i$), has on the demographic, demographic$_k$, such that:

$$MAX[\{composite\_score(Influencer(author_i)) \cdot impact(Influencer(author_i), demographic_k)\}]$$

will return the Influencer(article$_i$), which is the most likely to be the most popular to demographic$_k$. Alternatively, a ranked list of the top most likely popular influencers for a demographic may be returned.

Example Article Prediction for Targeted Demographic

For the purpose of explanation, assume that two articles, A and B, have been posted on a website and demographic data has been collected on the users that viewed both articles. Also assume that the composite score for articles A and B are 0.5 and 0.75, respectively. Further assume that the impact score for articles A and B are 0.001 and 0.01, respectively, for demographic D, which lead L belongs to. Accordingly, the most likely article for L to have read, or be interested in reading, is the article with the highest composite score multiplied by the impact score, e.g., MAX({A:0.5×0.001, B:0.75×0.01})=MAX({A:0.0005, B:0.075}). Thus, L is more likely to have read, or be interested in reading, B.

Example Author Prediction for Targeted Demographic

In some cases, it may be beneficial to predict which author or influencer is more likely to write an article or post that will be the most popular among readers that belong to a particular demographic D. For example, and for the purpose of explanation, assume that two authors, X and Y, post articles on a website; and demographic data is collected on the users that viewed those articles. Also assume that the composite score for authors X and Y are 0.5 and 0.75, respectively. Further assume that the impact score for authors X and Y are 0.001 and 0.01, respectively, for demographic D.

According to one embodiment, the most likely author to write the most popular article among readers that belong to demographic D is determined to be the author with the highest composite score multiplied by the authors' respective impact scores, e.g., MAX({A:0.5×0.001, B:0.75×0.01})=MAX({A: 0.0005, B:0.075}). Thus, in such an embodiment, Y is predicted to be more likely to write an article that is the most popular amongst D, even though X is generally more popular.

Improving Prediction Based on Topic

In some cases, it may be beneficial to predict an author or influencer's popularity relative to a particular topic. For example, suppose an editor for a news website, e.g., Forbes.com, needs to select an author to write an article discussing a new mobile application. Among the candidates for writing the article may be a poet and a technologist. Even though the poet may have a much higher composite score than the technologist, the poet may not be the best person to write an article on the topic of a new mobile application. Accordingly, adjusting an author or influencer's composite score based on a particular topic may improve prediction.

According to one embodiment, a "topic-adjusted composite score" is a composite score in which more weight is given to factors that relate to a particular topic. For example, when determining the poet and technologist's topic-adjusted composite score, articles or posts related to the topic of mobile applications may be given more weight. Consequently, even though the poet may otherwise have a higher composite score overall, the technologist may have a higher topic-adjusted composite score for the topic of mobile applications. Accordingly, the technologist may be predicted to write a more popular article discussing the new mobile application than would be written by the poet.

One way of giving more weight to factors that relate to a specific topic is to take into account, when generating the composite score for an author or influencer, only those factors that relate to that particular topic. For example, when generating the topic-adjusted composite score for a particular author for the topic "cars", only articles by the author that relate to the topic "cars" would be used to generate the composite score. Since the popularity of an author's articles may vary widely based on the topics to which they relate, the topic-adjusted composite scores for a single author may vary significantly.

In another embodiment, any author that is not sufficiently related to a particular topic may be excluded from consideration as a candidate for authoring an article on the topic. In the present example, if the poet has never published an article that relates to the topic mobile applications, then the poet may be excluded from consideration as a candidate to author the article for Forbes.

Trend Prediction

Historical data can also be used to predict what will be popular in the future as opposed to what is popular now. Trend prediction may predict, for example, an increase, decrease, or hold in popularity for any item and any item type. Trend prediction may also predict the rate an item is changing in popularity. For example, the rate an item is changing in popularity may represent the velocity of which an item is increasing, decreasing, or holding in popularity. Furthermore, trend prediction may also predict the derivative of the rate an item is changing in popularity. For example, the derivative of the rate an item is changing in popularity may represent the acceleration or deceleration of an item's popularity. Trend prediction may be based on any data gathered or computed above, any demographical information, current statistics, historical statistics, data collected from websites, or social media interactions. Machine learning models or other time-series-prediction models may be used to predict trends. Machine learning models that may be used include, but are in no way limited to, hidden Markov models, filtering models, and regression models.

Figure 3:
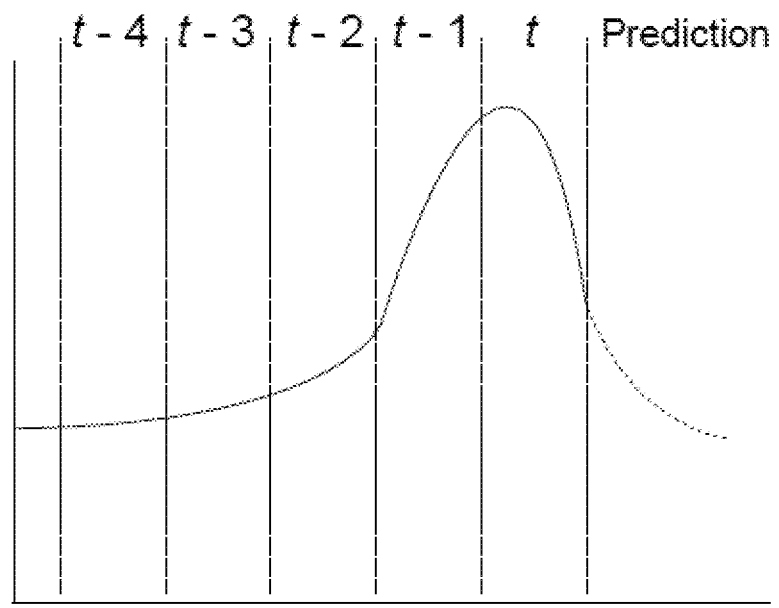
FIG. 3 illustrates a trend line and a predicted behavior based on a prediction model, according to an embodiment.

FIG. 3 illustrates a trend line and a predicted behavior based on a prediction model, according to an embodiment. The attempted prediction is the dotted portion of the line. In FIG. 3, t represents the current time slice, and t−k represents a time slice k time steps prior to t. A Markov model, or other prediction algorithm, could be used to predict the score, impact, rank, of an article, topic, author, or influencer globally or for a particular demographic. The Markov chain could also be augmented with information such as social information, gained from social media websites, current events, news, sentiment analysis of the related news, social media information, or any of the data or computations discussed above.

Ranking and Trend Prediction

As merely an example, in which articles are downloaded, the following exemplary process may be carried out, in an embodiment. This example is in no way meant to be limiting. While this example discusses particular steps according to an embodiment, other embodiments may omit, add to, reorder, and/or modify any of the steps below, based, at least in part, on the type of items scored, relaxed, and ranked and the particular methods used.

In step 1: Articles and data regarding the articles are downloaded from a website. Statistics, such as historical information, e.g., views, shares, comments, ratings, and sentiment, regarding the downloaded articles are also downloaded from the website.

In step 2: The topics are extracted from the downloaded articles using topic modeling.

In step 3: Social media information is downloaded and social network analysis is performed for each article. As part of the social network analysis for the influencers, for each article: a graph is constructed which includes the influencers' information regarding each share made by each influencer. Furthermore, for each article, the number of shares and re-shares are tallied. A community mining algorithm is used to obtain communities from the articles' respective graphs and find the most influential users. Sentiment analysis is performed to determine a ratio of positive to negative comments.

In step 4: The composite scores are computed. Until a threshold iteration difference is met, a source score, a social media score, and a composite score are iteratively computed and relaxed for each article, topic, author, and influencer.

In step 5: The impact scores are computed. For each of the articles, topics, authors, and influencers, in each demographic of a set of demographics, compute the attribute score for each attribute that defines each of the demographics in the set of demographics. Using the attributes scores, compute the impact score for each of the articles, topics, authors, and influencers for each demographic in the set of demographics.

In step 6: Rank the articles, topics, authors, and influencers in each of the demographics. The ranking is based on the product of each item's composite score and the impact score for each item and demographic, respectively.

In step 7: The topics movements in popularity are predicted based on the rank of the topic in a particular demographic, using a hidden Markov model, or other prediction algorithm. For example, if the expected rank of a topic begins to decrease in a particular demographic, the topic may be removed from the rankings of the demographic. The topic may be removed even though the topic may still be one of the highest ranked topics in that demographic because the topic is predicted to decrease in popularity for the particular demographic.

In step 8: The articles, authors, and influencers may also be predicted similarly.

Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
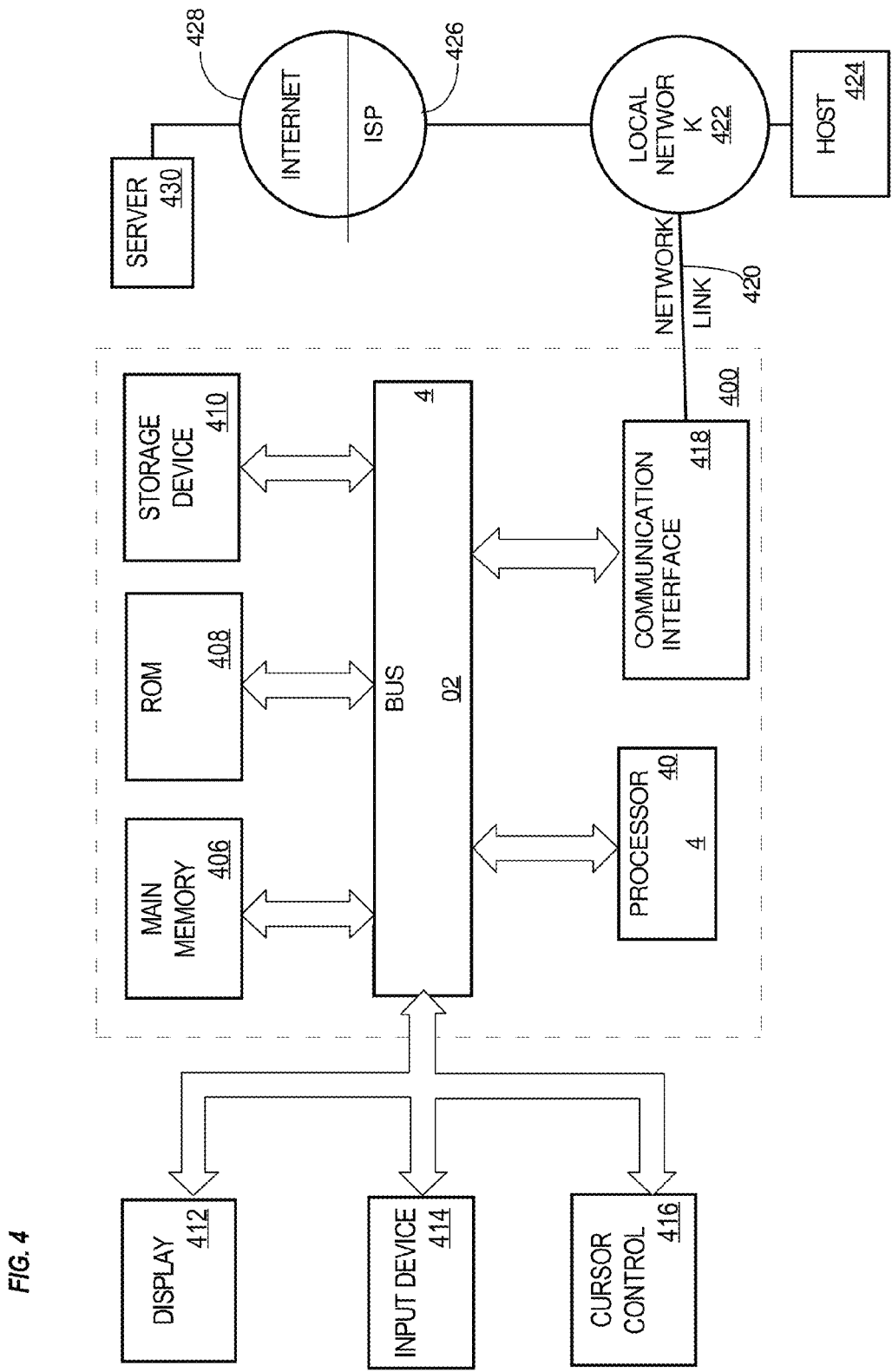
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to an embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
computing a first score for a first item that indicates popularity of the first item across all demographics;
computing a second score for a second item that indicates popularity of the second item across all demographics;
wherein the first item and the second item are a same item type;
computing a first impact score that indicates how popular the first item is for a particular demographic relative to other demographics;
computing a second impact score that indicates how popular the second item is for the particular demographic relative to other demographics;
computing a first demographic-specific popularity score for the first item based, at least in part, on the first score and the first impact score;
computing a second demographic-specific popularity score for the second item based, at least in part, on the second score and the second impact score; and
predicting that the particular demographic has a higher interest in the first item than in the second item based on the first demographic-specific popularity score being greater than the second demographic-specific popularity score;

wherein the method is performed by one or more computing devices.

2. The method of claim 1, wherein the same item type is one of articles, topics, authors, or influencers.

3. The method of claim 1 comprising:
selecting the particular demographic by selecting attributes, from a plurality of available attributes, that are possessed by a particular lead;
predicting that the particular lead has the higher interest in the first item than in the second item based on the first demographic-specific popularity score being greater than the second demographic-specific popularity score.

4. The method of claim 1, wherein:
the first item is a first article and the second item is a second article; and
further comprising predicting that people in the particular demographic are more likely to have read the first article based, at least in part, on determining that the first demographic-specific popularity score is greater than the second demographic-specific popularity score.

5. The method of claim 1, wherein the first item is a first topic and the second item is a second topic, and further comprising:
predicting that the first topic is more relevant to the particular demographic based, at least in part, on determining that the first demographic-specific popularity score is greater than the second demographic-specific popularity score.

6. The method of claim 1, wherein:
the first item is a first author and the second item is a second author; and
the method further comprises predicting that an article written by the first author is more likely to attract readers in the particular demographic than the second author based, at least in part, on determining that the first demographic-specific popularity score is greater than the second demographic-specific popularity score.

7. The method of claim 1, wherein:
the first item is a first influencer and the second item is a second influencer, and
the method further comprises predicting that an article promoted by the first influencer is more likely to attract more readers in the particular demographic than the article promoted by the second influencer based, at least in part, on determining that the first demographic-specific popularity score is greater than the second demographic-specific popularity score.

8. The method of claim 1, wherein:
the first item is a first author and the second item is a second author;
more weight is given to factors that relate to a particular topic, when computing the first score for the first item, than to factors that relate to topics other than the particular topic;
more weight is given to factors that relate to the particular topic, when computing the second score for the second item, than to factors that relate to topics other than the particular topic; and
the method further comprises predicting that an article related to the particular topic and written by the first author is more likely to attract readers in the particular demographic than the second author based, at least in part, on determining that the first demographic-specific popularity score is greater than the second demographic-specific popularity score.

9. The method of claim 1, wherein:
the first item is a first author and the second item is a second author; and
the method further comprises predicting that an article on a particular topic and written by the first author is more likely to attract readers in the particular demographic than the second author based, at least in part, on determining that the second author has not written any articles on the particular topic.

10. The method of claim 1, wherein:
the first item is a first influencer and the second item is a second influencer;
more weight is given to factors that relate to a particular topic, when computing the first score for the first item, than is given to factors that relate to topics other than the particular topic;
more weight is given to factors that relate to the particular topic, when computing the second score for the second item, than is given to factors that relate to topics other than the particular topic; and
the method further comprises predicting that the first influencer is more likely than the second influencer to attract readers in the particular demographic to an article related to the particular topic based, at least in part, on determining that the first demographic-specific popularity score is greater than the second demographic-specific popularity score.

11. The method of claim 1, wherein:
the first item is a first influencer and the second item is a second influencer; and
the method further comprises predicting the first influencer is more likely than the second influencer to attract readers in the particular demographic to an article on a particular topic based, at least in part, on determining that the second influencer has not promoted any article on the particular topic.

12. A non-transitory computer-readable medium storing instructions which, when executed by one or more processors, cause performance of a method comprising:
computing a first score for a first item that indicates popularity of the first item across all demographics;
computing a second score for a second item that indicates popularity of the second item across all demographics;
wherein the first item and the second item are a same item type;
wherein the same item type is one of articles, topics, authors, or influencers;
computing a first impact score that indicates how popular the first item is for a particular demographic relative to other demographics;
computing a second impact score that indicates how popular the second item is for the particular demographic relative to other demographics;
computing a first demographic-specific popularity score for the first item based, at least in part, on the first score and the first impact score;
computing a second demographic-specific popularity score for the second item based, at least in part, on the second score and the second impact score; and
predicting that the particular demographic has a higher interest in the first item than in the second item based on the first demographic-specific popularity score being greater than the second demographic-specific popularity score.

13. The non-transitory computer-readable medium of claim 12 comprising:
  selecting the particular demographic by selecting attributes, from a plurality of available attributes, that are possessed by a particular lead;
  predicting that the particular lead has the higher interest in the first item than in the second item based on the first demographic-specific popularity score being greater than the second demographic-specific popularity score.

14. The non-transitory computer-readable medium of claim 12, wherein:
  the first item is a first article and the second item is a second article; and
  the method further comprising predicting that people in the particular demographic are more likely to have read the first article based, at least in part, on determining that the first demographic-specific popularity score is greater than the second demographic-specific popularity score.

15. The non-transitory computer-readable medium of claim 12, wherein the first item is a first topic and the second item is a second topic, and the method further comprising:
  predicting that the first topic is more relevant to the particular demographic based, at least in part, on determining that the first demographic-specific popularity score is greater than the second demographic-specific popularity score.

16. The non-transitory computer-readable medium of claim 12, wherein:
  the first item is a first author and the second item is a second author; and
  the method further comprises predicting that an article written by the first author is more likely to attract readers in the particular demographic than the second author based, at least in part, on determining that the first demographic-specific popularity score is greater than the second demographic-specific popularity score.

17. The non-transitory computer-readable medium of claim 12, wherein:
  the first item is a first influencer and the second item is a second influencer, and
  the method further comprises predicting that an article promoted by the first influencer is more likely to attract more readers in the particular demographic than the article promoted by the second influencer based, at least in part, on determining that the first demographic-specific popularity score is greater than the second demographic-specific popularity score.

18. The non-transitory computer-readable medium of claim 12, wherein:
  the first item is a first author and the second item is a second author;
  more weight is given to factors that relate to a particular topic, when computing the first score for the first item, than to factors that relate to topics other than the particular topic;
  more weight is given to factors that relate to the particular topic, when computing the second score for the second item, than to factors that relate to topics other than the particular topic; and
  the method further comprises predicting that an article related to the particular topic and written by the first author is more likely to attract readers in the particular demographic than the second author based, at least in part, on determining that the first demographic-specific popularity score is greater than the second demographic-specific popularity score.

19. The non-transitory computer-readable medium of claim 12, wherein:
  the first item is a first author and the second item is a second author; and
  the method further comprises predicting that an article on a particular topic and written by the first author is more likely to attract readers in the particular demographic than the second author based, at least in part, on determining that the second author has not written any articles on the particular topic.

20. The non-transitory computer-readable medium of claim 12, wherein:
  the first item is a first influencer and the second item is a second influencer;
  more weight is given to factors that relate to a particular topic, when computing the first score for the first item, than is given to factors that relate to topics other than the particular topic;
  more weight is given to factors that relate to the particular topic, when computing the second score for the second item, than is given to factors that relate to topics other than the particular topic; and
  the method further comprises predicting that the first influencer is more likely than the second influencer to attract readers in the particular demographic to an article related to the particular topic based, at least in part, on determining that the first demographic-specific popularity score is greater than the second demographic-specific popularity score.

21. The non-transitory computer-readable medium of claim 12, wherein:
  the first item is a first influencer and the second item is a second influencer; and
  the method further comprises predicting the first influencer is more likely than the second influencer to attract readers in the particular demographic to an article on a particular topic based, at least in part, on determining that the second influencer has not promoted any article on the particular topic.

22. A computer system comprising:
  a memory;
  one or more processors coupled to the memory and configured to:
    compute a first score for a first item that indicates popularity of the first item across all demographics;
    compute a second score for a second item that indicates popularity of the second item across all demographics;
    wherein the first item and the second item are a same item type;
    compute a first impact score that indicates how popular the first item is for a particular demographic relative to other demographics;
    compute a second impact score that indicates how popular the second item is for the particular demographic relative to other demographics;
    compute a first demographic-specific popularity score for the first item based, at least in part, on the first score and the first impact score;
    compute a second demographic-specific popularity score for the second item based, at least in part, on the second score and the second impact score; and
    predict that the particular demographic has a higher interest in the first item than in the second item based on the first demographic-specific popularity score being greater than the second demographic-specific popularity score.

23. The computer system of claim 22, wherein the same item type is one of articles, topics, authors, or influencers.

24. The computer system of claim 22, wherein the one or more processors are further configured to:
- select the particular demographic by selecting attributes, from a plurality of available attributes, that are possessed by a particular lead;
- predict that the particular lead has the higher interest in the first item than in the second item based on the first demographic-specific popularity score being greater than the second demographic-specific popularity score.

25. The computer system of claim 22, wherein:
- the first item is a first article and the second item is a second article; and
- the one or more processors are further configured to predict that people in the particular demographic are more likely to have read the first article based, at least in part, on determining that the first demographic-specific popularity score is greater than the second demographic-specific popularity score.

26. The computer system of claim 22, wherein:
- the first item is a first author and the second item is a second author; and
- the one or more processors are further configured to predict that an article written by the first author is more likely to attract readers in the particular demographic than the second author based, at least in part, on determining that the first demographic-specific popularity score is greater than the second demographic-specific popularity score.

27. The computer system of claim 22, wherein:
- the first item is a first author and the second item is a second author;
- more weight is given to factors that relate to a particular topic, when computing the first score for the first item, than to factors that relate to topics other than the particular topic;
- more weight is given to factors that relate to the particular topic, when computing the second score for the second item, than to factors that relate to topics other than the particular topic; and
- the one or more processors are further configured to predict that an article related to the particular topic and written by the first author is more likely to attract readers in the particular demographic than the second author based, at least in part, on determining that the first demographic-specific popularity score is greater than the second demographic-specific popularity score.

28. The computer system of claim 22, wherein:
- the first item is a first influencer and the second item is a second influencer;
- more weight is given to factors that relate to a particular topic, when computing the first score for the first item, than is given to factors that relate to topics other than the particular topic;
- more weight is given to factors that relate to the particular topic, when computing the second score for the second item, than is given to factors that relate to topics other than the particular topic; and
- the one or more processors are further configured to predict that the first influencer is more likely than the second influencer to attract readers in the particular demographic to an article related to the particular topic based, at least in part, on determining that the first demographic-specific popularity score is greater than the second demographic-specific popularity score.

* * * * *